United States Patent

[11] 3,614,652

[72] Inventor Van O. Nicolai
    Reston, Va.
[21] Appl. No. 31,473
[22] Filed Apr. 24, 1970
[45] Patented Oct. 19, 1971
[73] Assignee The United States of America as
    represented by the Secretary of the Navy

[54] OPTICAL WINDOWS FOR LASERS
    1 Claim, 1 Drawing Fig.
[52] U.S. Cl. .................................................. 331/94.5,
                                                         350/1
[51] Int. Cl. .................................................. H01s 3/02,
                                                         G02b 1/00
[50] Field of Search ........................................ 331/94.5;
                                                         350/1

[56] References Cited
    OTHER REFERENCES

Billard, " Materials Utilizable in ...Infrared," U.S. Gov' t. Res. & Dev. RPRT #AD601845, July 6, 1964, pp. 1– 6, 64, 65, 84, 85 & 86. 350/1

Cheo et al., "Gain...of $CO_2$ Laser...at $10.6\mu$," IEEE J. Quant. Elec. Vol. QE– 3, No. 2, Feb. 1967, pp. 79– 84.

Johnson, " Properties of Crystals for ...IR Optics" Optical Spectro, Vol. 1, No. 2, June 1967, pp. 41– 43.

McCarthy, " The ... X Mission of IR Materials v:$2\mu - 50\mu$," App. Opt. Vol. 7, No. 10, Oct. 1968, pp. 1997– 2000.

Novikova et al., " Thermal Expansion of ... GaSb...at Low Temperatures," Soviet Phys.-Solid State Vol. 5, No. 8, Feb. 1964, pp. 1558– 9.

Primary Examiner—Ronald L. Wibert
Assistant Examiner—R. J. Webster
Attorneys—R. S. Sciascia, Arthur L. Branning and James G. Murray ABSTRACT: A gallium antimonide optical window component for use in high-power gas phase lasers.

PATENTED OCT 19 1971
3,614,652
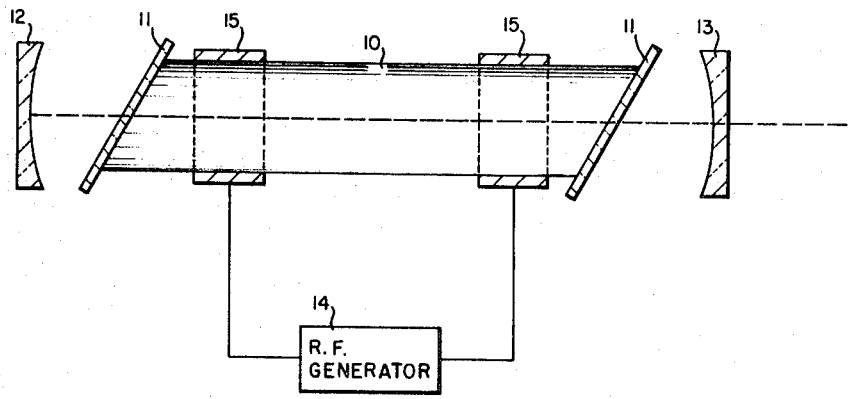
INVENTOR
VAN O. NICOLAI
BY *Cirus of Brannon*
ATTORNEY 3,614,652

OPTICAL WINDOWS FOR LASERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to optical components used in gas-phase lasers. In particular the invention concerns windows for use in high-power gas lasers.

With the development of higher-powered laser beams, a need for optical windows which will transmit these beams without self-destruction has come about. Possibly the most well-known high-powered gas laser is the $CO_2$ laser which emits beams having a 10.6 micron wavelength. As the power is increased, more laser beam energy is absorbed in the bulk, crystal lattice or on the surface of the laser window. If the window is not cooled in anyway, its temperature will continue to rise until the physical or mechanical properties of the material alter sufficiently to cause failure by softening, plastic slip, evaporation, dissociation, or melting. The inevitable and necessary cooling processes which are always present can keep the temperature below the critical point for material destruction in many cases, depending on the power levels involved and the details of the cooling scheme. However, cooling always involves the introduction of temperature gradients which result in the production of elastic internal stresses. Frequently these thermal stresses lead to mechanical failure of the window.

At the present time, commercial carbon dioxide lasers achieve power outputs exceeding 100 watts and research units have been built with a capability of over 5,000 watts. An output window with an absorption of only 1 percent must, therefore, be capable of dissipating from 1 to 50 or more watts. Consequently, the most common failure mechanism for window materials is thermal fracture resulting from internal stresses. Also, it has been found that certain materials possess "thermal runaway" characteristics. This is an unstable condition whereby the optical absorption coefficient increases with a temperature increase at a sufficient rate such that the temperature goes out of control. This results in the aforementioned failure mechanisms such as thermal fracture, dissociation, melting, etc.

The prior art has described the absorption mechanism for the photons of the laser beam as being a multiphonon process (Klein, C.A., et al., High-Power, 10.6 Micron Windows, Raytheon Research Division, Final Technical Report, Contract No. DA-AH01-67-1589, Sept. 1968) In this process a 10.6 micron photon is absorbed and two or more phonons are produced. Transverse optical, longitudinal optical, transverse acoustic, and longitudinal acoustic phonons in various combinations are created so that the sum of their frequencies is equal to the frequency of the photon. Materials with the lowest transverse optical frequency can generally be expected to have the lowest coefficient of absorption.

The absorption characteristics of numerous optical materials have been calculated and also tested at varying laser beam wavelengths and power levels. Two of the most promising are potassium chloride and gallium arsenide. Potassium chloride has an absorption coefficient less than 0.02 cm.$^{11}$ at 10 micron and is relatively inexpensive Since it is hygroscopic it tends to trap water at minute surface dislocations which results in deterioration and higher surface absorption coefficients. Its failure mechanism is by thermal fracture. Gallium arsenide is probably the best high-power optical window material presently available. With only room temperature cooling, GaAs windows can handle up to 14 kW. before failing. Its lattice absorption at 10.6 micron has been measured at 0.006 cm.$^{11}$. The ultimate failure mechanism for GaAs is thermal fracture. One disadvantage is that it can only be obtained in small sizes—less than 2 in. in diameter.

OBJECTS OF THE INVENTION

It is an object of this invention to provide an optical component for a high-power laser.

It is also an object of this invention to provide an optical component for a laser which will transmit high-powered laser beams without mechanical failure.

It is a further object of this invention to provide a laser window with physical and mechanical properties which will withstand the effects of a high-powered laser beam.

Other objects, advantages and novel features of the invention will become apparent from the following detailed description of the invention when considered in conjunction with the accompanying drawing.

SUMMARY OF THE INVENTION

According to the present invention, an optical component for a gas phase laser is provided which comprises gallium antimonide.

BRIEF DESCRIPTION OF THE DRAWING

The single FIGURE is a simplified diagrammatic view of a gas-filled laser system illustrating the optical components of the present invention.

DESCRIPTION OF THE PREFERRED EMBODIMENT

In accordance with this invention, gallium antimonide is used as an optical window in high-power gas phase lasers. It has a 17 percent lower transverse optical resonance frequency and is more covalent than gallium arsenide. Because of the mechanisms described in the prior art above and the fact that it is a heavier atom than GaAs (191.47 for GaSb vs. 144.64 for GaAs), the gallium antimonide will have a lower absorption coefficient than the gallium arsenide.

Gallium antimonide melts at approximately 840° C. compared to 1,240° C. for GaAs. Additionally, it has a much lower vapor pressure which, together with its lower melting point, allows relatively greater ease in producing GaSb crystals in large sizes. It can be machined and polished to high quality and doped with various materials for use in high resistivity form.

A particularly suitable application is that of a Brewster window for a gas laser tube. Such windows must be fixed to the laser tube in such a manner as to prevent any leakage of gas from within or without the tube. The window must also be as optically flat as possible and mechanical stresses must be minimized to avoid distortion of the optically flat portion of the window. U.S. Pat. No. 3,420,603 describes a suitable technique for mounting the gallium antimony window of this invention. It suggests reducing the thickness of the periphery of the window to form a thin flange which will, in turn, transmit less mechanical stress from the laser tube.

If the laser tube has metal ends it is preferable to utilize 0-ring vacuum seals to attach the GaSb windows to the tube. Other techniques would be direct fusion bonding if the tube body is made of fused silica or the like. Various adhesives may also be utilized.

Referring now to the drawing, the device shown therein comprises a tube 10, and having GaSb windows 11 at the ends thereof sealed at the appropriate Brewster angle. As is known, the Brewster angle windows decrease reflective losses and permit a higher gain per pass of the light beam, resulting in higher power output.

A mirror 12 is mounted externally of the tube at its left end; while a similar mirror 13 is externally mounted at the right end of the tube. The mirrors could also be mounted within the laser tube if desired. The mirrors may be glass, copper or other suitable material and are preferably coated so as to provide maximum reflectance at the emitted wavelength, although broadband mirrors may be utilized if it is desired to obtain possibly more than one emitted frequency. The mirror 13 is not entirely reflective so as to provide a small transmittance. The mirrors are desirably separated by a distance equal to an even multiple of the wavelength which it is desired to amplify, thereby providing the desired resonant cavity effect. When a tube filled with a suitable gas mixture such as $CO_2$–$N_2$ and is excited by means of a radio frequency generator 14, which is connected to conducting bands 15 disposed around the tube, the emission of continuous beams of coherent radiation is achieved. A cooling system is usually required but has not been shown in the drawing for purposes of simplicity.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In system for the generation of high-power coherent beams of radiation in the far infrared including a tube containing a gas mixture having optical windows disposed at the ends of the tube, means for exciting the gas mixture to produce laser radiation in the far infrared and means for coupling said laser radiation from said mixture; the improvement comprising gallium antimonide as a far infrared window material.